July 25, 1967  W. A. BRASTAD  3,332,370
BREAD MAKING PROCESS
Filed Nov. 27, 1964
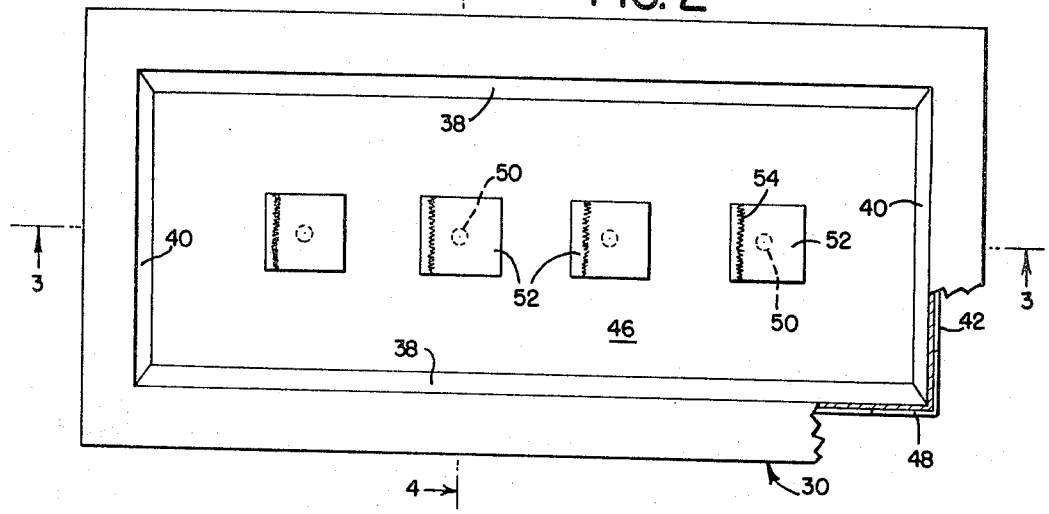
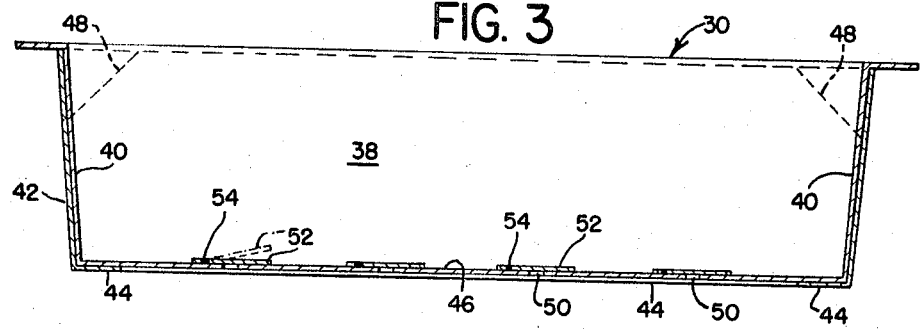
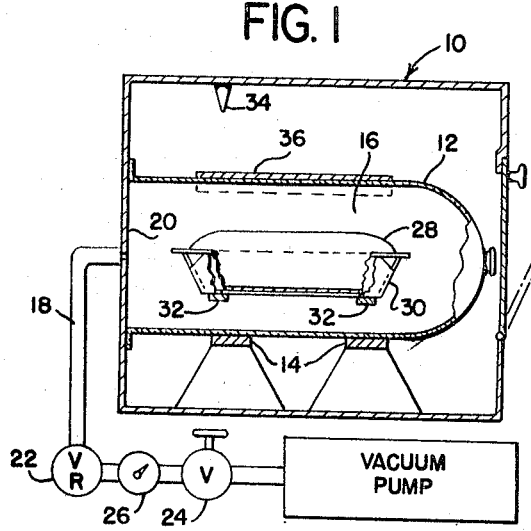
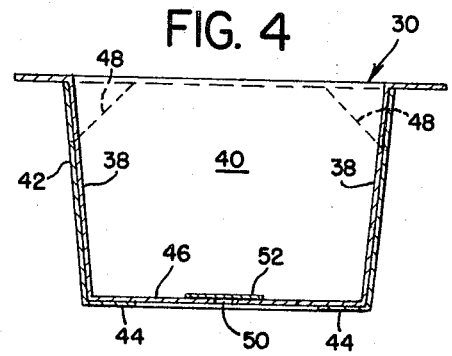
INVENTOR.
WILLIAM A. BRASTAD
BY Robert B. Hughes
ATTORNEY

United States Patent Office 3,332,370
Patented July 25, 1967

3,332,370
BREAD MAKING PROCESS
William A. Brastad, Minneapolis, Minn., assignor to
General Mills, Inc., a corporation of Delaware
Filed Nov. 27, 1964, Ser. No. 414,391
14 Claims. (Cl. 107—54)

The present invention relates to a process for making bread, and more particularly to a process whereby developed dough can in a relatively short time be made into a high quality baked bread product.

Over the years a quite common method of making bread (called a "straight dough method") has been a batch process wherein the various ingredients (i.e. the flour, yeast, salt and water, with additions of fats or other related substances, sometimes also with yeast foods and malt) are mixed into a dough. This dough is then permitted to stand for about three hours, this being called the period of "bulk fermentation." During this period of bulk fermentation, many things take place within the dough. There is amylolytic breakdown of part of the starch to form fermentable sugars; carbon dioxide is produced by yeast fermentation causing the dough to expand; flavor forming components are produced; and there is hydration and other changes in the wheat proteins to make the dough strong and extensible. Part way through this period of bulk fermentation (after about the first two hours) the dough is usually "knocked down," this conveniently being accomplished by mechanically mixing the dough for about a minute to release part of the entrapped gas which has developed during the first two hours of bulk fermentation. The dough then is permitted to stand for the rest of the period of bulk fermentation (i.e. for about one hour).

After the period of bulk fermentation, the dough is divided into pieces or lumps, each of which corresponds in quantity to an ultimate loaf of bread; this usually is accomplished by means of an apparatus called a "divider." The divided pieces are then passed through a device called a "rounder" which shapes each piece to a more compact and ball-like configuration. Since the dividing and shaping of the dough compresses and distorts the dough so as to have a harmful effect on its cell structure, the rounded lumps of dough are permitted to stand for a period of about a quarter to a half hour, this period of processing being called an "intermediate proofing." During the intermediate proofing free gas is further generated or released from solution within the dough.

After the intermediate proofing, the dough lumps are each shaped into a loaf configuration and placed into baking pans preparatory to the "final proofing." As the dough lumps are shaped into their final loaf form for final proofing, the dough is worked to some extent to subdivide and distribute the gas in the dough. This final proofing of the dough is accomplished by permitting the shaped dough pieces to stand in the pans for a period of about forty-five minutes, during which time more free gas is released in the dough to increase substantially the volume of the dough. Then the dough is baked to form the finished loaves of bread. In the final baking step, there is usually a further expansion or enlargement of the dough to form the finished loaves of bread having the desired volume and cell structure.

There are, of course, other bread making methods, a common one of them being called the "sponge method." This method differs from the straight dough method in the initial steps of the process (i.e. the initial mixing and the bulk fermentation), while the latter steps (i.e. dividing the dough, the intermediate proofing, panning the dough, final proofing and baking) are performed in substantially the same manner as in the straight dough method.

Over a considerable number of years, various approaches have been taken to simplify and also to shorten the processes for making bread on a commercial scale, with varying degrees of success. Also attempts have been made to incorporate various ingredients to enhance the flavor, texture, color and other qualities of the final bread product, and in some cases certain ingredients have been used in conjunction with simplifications in the processing steps, usually in an attempt to compensate for the lack of certain compounds or changes that would be developed in the dough in the longer conventional bread making processes. Another avenue has been to incorporate in the dough air or other gases or to add substances which would generate gases in the dough, as a means of shortening or by-passing the raising of the dough by yeast fermentation. Also various changes in processing conditions (e.g., time, temperature, pressure) have been tried to obtain various effects. And of course, quite an array of mechanical devices has come into being to aid in the bread making process.

Although for the most part, these various attempts have produced certain desired results, often they are offset by some disadvantage. For example, quite often some quality of the end product such as flavor, cell structure, color, etc., may be less than wholly desirable, or sometimes the expense is prohibitive. In some cases the matter of quality control becomes too difficult in that a satisfactory end product can be made under closely controlled laboratory conditions, but these conditions cannot be consistently duplicated when making bread on a commercial scale.

In contrast to this, a rather significant and commercially successful improvement in recent years has been that of "developing" the dough mechanically, rather than depending upon the bulk fermentation period to accomplish the same ends. In this process the first step is to prepare a "brew" by taking some of the dough ingredients, these usually being the water, sugar, salt, non-fat milk solids, yeast, yeast food and part of the flour, and mixing these into a slurry which is permitted to stand and ferment for about two and one-half hours. During this time certain components which enhance the quality of the end bread product are developed in the brew. This brew is then added to the rest of the flour, lard, emulsifier, possibly along with some other additives, and the total ingredients are mixed into a dough and then worked quite vigorously mechanically for about one or two minutes in a device appropriately called a "developer." This relatively brief period of mechanical developing produces generally the same physical effects as does the period of bulk fermentation, one of the more significant of which is believed to be a cross linking of the gluten molecules to produce a stronger and more extensible dough. The dough can then be taken from the developer, be placed directly into baking pans, be permitted to stand for a final proofing period of about forty-five minutes, and then be baked in an oven to form the finished bread product.

A comparison of the bread making process incorporating the mechanical development of the dough with one of the earlier conventional processes such as the straight dough method reveals that the total processing time of the former is appreciably shorter. The period of bulk fermentation (and in some methods also the intermediate proofing) is eliminated, since it is necessary only to mix the ingredients into a dough and develop the dough mechanically (the mixing and developing taking only a total of about three minutes) and then to give the bread a final proofing of about forty-five minutes before baking the bread, the baking taking about twenty to thirty minutes. Of course, preliminary to the mechanical developing of the dough, it is necessary to prepare a brew and let it stand for a two to three hour period, but this is a task simpler than the accomplishment of the bulk fermentation.

Yet to the best knowledge of the applicant there has been devised no improvement which effectively shortens, simplifies or by-passes the final proofing and baking of the bread. Most prior art attempts which modify the conventional methods of final proofing have usually either resulted in an end product whose volume, cell structure, uniformity or some other quality is deficient in some regard, or the process has simply not proven to be practical for a commercial operation.

In view of this it is a principal object of the present invention to provide an improved process whereby bread dough which has been developed, can rapidly and conveniently be made into a finished bread product of high quality without any prolonged period of final proofing.

It is a further object to provide such a process which especially lends itself to being practiced in a simple and reliable manner as part of a commercial operation. In this regard, in the process of the present invention the developed dough is subjected to a partial vacuum to raise the dough to a desired level and then the dough is baked. During the baking period, the reduced pressure within the baking chamber is restored to the level of atmospheric pressure so that when the baked bread is removed from its baking chamber and exposed to the atmosphere, there is no abrupt pressure change to collapse or otherwise damage the structure of the bread. In the preferred embodiment, this is very simply accomplished by first establishing a relationship between the quantity of dough being baked and the volume of a vacuum baking chamber of the oven in which the bread is baked. A partial vacuum is applied to the baking chamber in which the dough is placed, to raise the dough to the desired extent; then the baking chamber is sealed off and heat is applied to the bread in a suitable manner, for example by means of heating elements such as those used in a conventional baking oven or in a much faster manner by using microwaves. In either case, regardless of the residence time in the oven, at the completion of the baking period, sufficient gas has been released from dough being baked into the bread to bring the pressure within the oven back to atmospheric, and the rate at which the pressure within the oven rises to atmospheric is such that the end result is a bread product having a proper volume, cell structure, uniformity and other characteristics desired in a high quality bread product.

These and other objects and features of the invention will be more readily understood and appreciated from the following detailed description of the preferred embodiment thereof selected for purposes of illustration and shown in the accompanying drawings, in which:

FIGURE 1 is a semi-schematic view, taken generally in side elevation, of an apparatus by which the process of the present invention can be practiced;

FIG. 2 is a top plan view of a bread pan used in the present invention, and also showing the shielding used when baking with a particular type of microwave oven disclosed hereinafter;

FIG. 3 is a longitudinal sectional view taken on line 3—3 of FIG. 2; and

FIG. 4 is a transverse sectional view taken on line 4—4 of FIG. 2.

The steps of the process of the present invention can be described in general terms as follows:

(a) taking a developed dough and reducing the ambient pressure to a level below atmospheric, at which level the dough expands to the desired extent;

(b) applying heat to the expanded dough so as to bake the same into a finished bread product, and (c) during the period that heat is so applied to the dough, raising the ambient pressure at a predetermined rate in relation to the rate at which the dough is baked so that at the completion of the baking period, the ambient pressure is atmospheric.

Especially significant in the present invention is the particular technique utilized in restoring the ambient pressure back to atmospheric during the baking process. It is believed that this can best be understood by referring to FIGURE 1, wherein is illustrated an apparatus by which the present invention can be practiced. The precise apparatus shown herein would, of course, be somewhat unsuited for a commercial baking operation, but this apparatus is here illustrated since it is believed that this uncomplicated form of the apparatus better serves to disclose the inventive features of the process of the present invention. It comprises an oven 10 in which is placed a bell jar 12 which rests on supports 14 in the oven 10 and defines a vacuum chamber 16 within the oven. So that a vacuum can be applied to the chamber 16 of the bell jar 12, there is provided a pipe 18 extending from the back wall 20 of the oven 10 through a pressure relief valve 22 and through a shut off valve 24 to a vacuum pump. A pressure gauge 26 is provided between the two valves 22 and 24.

A predetermined quantity of developed dough 28 is shaped in a desired configuration, inserted into a pan 30, and the panned dough 28 is then placed in the vacuum chamber 16 defined by the bell jar 12, the pan 30 being placed on a pair of support struts 32 in the jar 12. The shut-off valve 24 is opened and the vacuum pump is operated to reduce the pressure within the bell jar chamber 16 to a level to cause the dough 28 to expand to the desired extent. As a general rule, the pressure in the chamber 16 is reduced to a level at which the dough reaches a volume to which the dough would rise if it were to stand for the period of final proofing. For most bread formulations commonly used in commercial making operations in the United States, a developed bread dough will rise to the desired extent when the pressure is reduced from atmospheric (i.e. about 15 pounds per square inch) to between about 7 to 4 pounds per square inch absolute pressure, with best results being attained at about 5 pounds per square inch. With a pressure as low as 3 p.s.i., the dough will tend to expand to too great a degree, while with a pressure as high as 10 p.s.i. the degree of expansion tends to be not great enough. (These are by no means absolute limits, but are the approximate limits within which the most desirable results are achieved). When the pressure in the bell jar chamber 16 has reached this approximate 5 p.s.i. level, the shut-off valve 24 is closed to seal the chamber 16, and the oven is turned on to apply heat to the dough 28 which then becomes baked into a finished bread product.

During the baking process, various gases are developed in the dough. Water in the dough vaporizes or boils off; carbon dioxide and air which are bound or dissolved in the dough are released; and these gases along with those which were previously entrapped within the dough are caused to expand as the temperature rises in the vacuum baking chamber. Some of these gases remain in the dough to expand the same and develop the cell structure during the baking process, but most of these gases are released and pass into the ambient atmosphere.

As indicated previously herein, there is a predetermined relationship between the volume of the vacuum baking chamber 16 and the quantity of dough 28 placed therein. This relationship should be such that the amount of gases released from the dough 28 during baking raise the pressure within the baking chamber 16 to a near atmospheric level by the end of the baking period. If the quantity of dough is too small in comparison with the volume of the vacuum baking chamber, the pressure within the baking chamber will be substantially below atmospheric at the completion of the baking period, with the result that the baked bread will collapse to some degree when it is removed from the baking chamber and exposed to atmospheric pressure. On the other hand, if the quantity of dough is too great in comparison with the volume of the vacuum baking chamber, the pressure within the chamber will rise too quickly (the chamber being sealed during the baking process), and the dough will begin to collapse or will not be permitted to expand sufficiently to give a loaf of the desired volume. The pressure relief valve 22 is set so that when the pressure in the chamber 16 of the bell jar rises above atmospheric, the valve 22 opens to release gas from the chamber 16 and maintains the pressure in the chamber 16 at or near atmospheric.

This relationship between the quantity of dough being baked and the volume of the vacuum baking chamber depends to some extent on the nature of the dough being baked and the character which is desired for finished bread product. For the general type of bread dough presently used in commercial baking operations in the United States to produce the type of high volume loaves presently desired as an end product, the ratio of the volume of the vacuum baking chamber to the quantity of dough being baked can be varied between roughly about 10 and 30 cubic centimeters to one gram of dough, with best results being attained between about 18 and 22 cc. to one gram of dough. When the ratio of the volume to the dough quantity is as low as 5 cc. to one gram of dough, the volume of the resulting bread product is sometimes less than wholly satisfactory, and when this ratio is as high as 50 cc. to one gram of dough, often an insufficient quantity of gases is developed to raise the pressure in the chamber back to atmospheric. These numerical limitations are by no means especially critical limits, but are the approximate limits within which satisfactory results can be achieved.

If no pressure relief valve, such as that indicated at 22, or other pressure relief means were utilized to prevent an excess of pressure developing in the chamber 16, the lower limit of the chamber volume-to-dough quantity ratio would be more critical, since a pressure substantially higher than atmospheric could develop within the chamber 12 with the result that the bread would tend to expand so as to rupture when exposed to atmospheric pressure. However, by using the pressure relief valve 22 to develop a proper loaf of bread, it is necessary only that the pressure in the chamber 16 does not rise too sharply during the initial stages of the baking when the dough is still quite pliable and the gas entrapped within the cell structure of the dough is still substantially less than atmospheric.

The formulation for the bread dough used in the present invention will depend, of course, upon the character of the bread desired as an end product. A typical bread dough formula would include as ingredients flour, water, sugar, salt, milk solids, yeast food, yeast, lard, emulsifiers, oxidizing agents, and perhaps some other additives, one such formula being recited in the first Example herein. Any suitable bread dough formulation can be used, and these are, of course, many and well known in the art.

As indicated previously, the process of the present invention begins with a dough which has been developed and is ready for final proofing. Any of the various methods of preparing a developed dough can be used in the present invention, such as employing a period of bulk fermentation or developing the dough mechanically. Here again, the art of developing dough is old and well known in the baking industry, and the particular method used will depend again on the character of the end product desired.

After the developed dough is panned, the vacuum is applied to the dough in a suitable manner. In the apparatus shown herein, the pressure was reduced from atmospheric to five p.s.i. in about a half minute to a minute, but longer or shorter periods could be employed. This raises the dough to a volume which corresponds approximately to the volume to which the dough would be raised if it were permitted to stand for a period of final proofing. For most dough formulations used in commercial baking operations in the United States, this increase in volume of the developed dough from that before final proofing to that after final proofing is about 300 to 400 percent.

It is believed that applying a vacuum to the developed dough causes a release of gases within the dough and an expansion of both the gases so released and those which were previously entrapped within the dough, to create a cell structure quite similar to that which would otherwise be achieved by a period of final proofing. In most conventional bread making processes, there is of course, free carbon dioxide entrapped in the dough, and there is also a certain amount of carbon dioxide which exists in solution in the developed dough. In the straight dough process, this carbon dioxide is developed throughout the period of bulk fermentation and proofing periods with some going into solution and some becoming free gas so as to cause the dough to rise. In the mechanical developing process, a certain amount of carbon dioxide is developed in the brew and remains in solution in the brew, which is then incorporated with the rest of the ingredients to make a bread dough. When the vacuum is applied to the developed dough, some of this carbon dioxide goes out of solution and the release and expansion of this carbon dioxide along with the expansion of the gas already entrapped in the dough, causes the dough to rise.

Experimental results lead to the belief that the carbon dioxide has a definite contribution in causing the dough to rise properly. When a "developed" bread dough was prepared by using carbonated water but without any yeast fermentation, and a finished bread product was made according to the process of the present invention, the end product had a volume and cell structure which resembled bread of a suitable quality, although the flavor of the bread was less than wholly desirable. However, when a bread dough was prepared with no substantial amount of carbon dioxide (i.e., with no yeast fermentation and using non-carbonated water), the volume of the resulting loaf made according to the process of the present invention was down and the cell structure was less desirable than the loaf made with the carbon dioxide.

After a vacuum is applied to the developed dough according to the present invention, any suitable baking method can be used to produce the finished bread product. Since the effect of the vacuum proofing is to reduce the period of final proofing from 45 minutes to the very short time (e.g., a minute or so required to place the dough in a vacuum cooking chamber and apply a vacuum thereto), to effect a relatively fast overall bread making process, an especially desirable method of baking dough is to employ microwave baking. One piece of apparatus which is suitable for this microwave baking is an oven celled a "Radarange Electric Oven," Model 1170, made by the Raytheon Manufacturing Company of Waltham, Massachusetts. This oven employed radiation of a frequency of 2,450 megacycles per second, and will cook a loaf of bread weighing 550 grams in a period of about 5½ minutes. A nonmetallic container, such as the cardboard pan 30, should be used to hold the bread so that the microwaves can properly penetrate the bread dough. The interior of the pan 30 is desirably coated with a suitable material, such as polyethylene, so that when the pan 30 is greased preparatory to placing the dough 28 therein, the pan 30 will not absorb the grease.

In this particular microwave oven (i.e., the "Radarange Electric Oven"), the radiating element is located at the top of the baking chamber (the approximate location of this tip being indicated at 34 in FIG. 1) and there is a tendency for the top portion of the dough 28 to be subjected to a greater intensity of heat. Hence, it is desirable to shield the dough, as with metal foil, in a manner to achieve a greater uniformity of cooking. With the particular arrangement of the apparatus shown in the accompanying drawing, such shielding foil can be applied by attaching a sheet of foil 36 to the top of the bell jar 12, and by covering the side and end walls 38 and 40, respectively, of the pan 30 with a foil coated cardboard piece 42. This shielding piece 42 has a lip of flange portion 44 which extends around the periphery of the bottom wall or floor 46 of the pan 30 (thus leaving the center portion of the bottom wall 46 exposed), and has the upper corner portions thereof notched, as at 48. It is to be understood, of course, that if another type of microwave oven is used in which the distribution of the microwaves in the cooking chamber is different, or if the dough is disposed differently in the oven, other appropriate shielding arrangements could be required to insure uniformity in the baking of the dough.

Since the rate of heat transfer to the bread dough in the microwave oven is quite intense, gases are developed quite rapidly in the dough, and some of these gases will be emitted through the dough surfaces adjacent the pan 30. Hence the floor 46 of the pan 30 is provided with a plurality of vent holes 50 to permit the escape of this gas. When employing microwave baking, there is a tendency for the dough 28 to squeeze out such vent holes 50. Thus it has been found beneficial to cover each of the holes 50 with a respective one of several wax paper pieces 52, each of which is glued or otherwise secured by one edge 54 to the bottom wall 46. This prevents the dough 28 from squeezing out the holes 50, but when gases develop in the bottom of the pan 30, the dough 28 lifts slightly and pulls the wax paper pieces 52 up enough to permit gas to escape out the holes 50. Since the microwave oven bakes the bread in such a manner that no crust is formed, it may be desired to brown the outside of the bread in some manner at the completion of the microwave baking, as by placing the baked bread in a hot air oven for a few minutes.

As indicated previously, a conventional baking oven can be used instead of a microwave oven. When a conventional baking oven was used, the dough was placed in the bottom of a desiccator jar which served as the baking pan and as the vacuum chamber. With that particular arrangement, the time required to bake a loaf in the conventional oven had to be lengthened somewhat compared to the usual practice (i.e., about 25 to 40 minutes). The reason for this is believed to be that the presence of the glass pan reduced the rate of heat transfer from the heating elements in the oven to the dough compared to the heat transfer to a darker colored metal pan which is usually employed in most bread baking operations.

It is evident that with the slower baking of the conventional oven, gases are generated in the dough loaf 28 and emitted therefrom at a slower rate than in the case of cooking in a microwave oven. However, by establishing the proper relationship between the volume of the baking chamber and the quantity of dough being baked, regardless of the rate at which the baking is accomplished, the pressure rises in the baking chamber at a rate such that a proper cell structure and volume are developed in the bread dough. That is to say, when a conventional making method is used, even through gases are generated more slowly in the dough so that pressure within the vacuum baking chamber rises more slowly, the structure of the bread and the final baked character thereof also develop at a correspondingly slow rate. The opposite is true when the bread is baked by the microwave oven. That is to say, the gas develops in the bread dough more rapidly to raise the pressure in the vacuum baking chamber more rapidly, but the structure and baked character of the bread develop at a correspondingly fast rate.

The present invention will be disclosed with more particularity in the following examples:

EXAMPLE I

A brew is prepared by mixing the following ingredients and permitting the same to stand at a temperature of 86° F. for a period of 2½ hours:

| Ingredients: | Grams |
| --- | --- |
| Water | 3,250 |
| Sugar (sucrose) | 400 |
| Salt | 115 |
| Non-fat milk solids | 200 |
| "Arkady" (mineral salt yeast food) | 25 |
| $Ca(H_2PO_4)$ | 15 |
| Compressed yeast | 162¼ |
| Flour (baker's grade of wheat flour) (14% moisture basis) | 1,500 |

Then this brew is mixed with the following ingredients.

| Ingredients: | Grams |
| --- | --- |
| Flour (14% moisture basis) | 3,500 |
| Lard | 150 |
| SGF104 (glycerol monostearate) (Durkee monoglyceride) | 12½ |
| $KBrO_3$ (oxidizing agent) | .25 |
| $KIO_3$ (oxidizing agent) | .025 |

This is done by placing the ingredients in a Hobart vertical mixer, Model H600, having a 30-qt. bowl. The ingredients are mixed for ½ minute at the first speed of the mixer, and then mixed for one minute at the second speed of the mixer.

The mixed dough is then placed in a Wallace and Tiernan "Continuous Dough Developer." This dough developer is operated at a speed of 190 r.p.m., and the average residence time of the dough in this developer is one minute. Five hundred and fifty grams of this dough is extruded from the developer into a cardboard pan.

This 550 grams of panned dough is then placed in a Radarange Electric Oven, Model 1170, produced by the Raytheon Manufacturing Company, Waltham, Massachusetts, and is shielded by foil as shown in the accompanying drawing. A bell jar having a volume of 12,320 cubic centimeters is placed over the dough loaf, and air is withdrawn from within the bell jar by means of an aspirator in a manner that in a period of 50 seconds, the pressure within the bell jar is reduced from atmospheric to 5 pounds per square inch absolute. The bell jar is provided with a pressure relief valve, so that if at any time the pressure within the bell jar is greater than atmospheric, gas is released from within the bell jar to the atmosphere. The dough is cooked for 5½ minutes in the oven, after which time it is removed from the oven. The end product is a baked loaf of overall good quality.

EXAMPLE II

The same process is followed as in Example I, except that instead of using the Radarange Electric Oven, a conventional baking oven is used. In this example, the baking time is 40 minutes, and the product is a loaf of bread of overall good quality.

It should be understood that the foregoing is merely illustrative of certain embodiments of the invention and many variations may be made by those skilled in the art without departing from the spirit and scope of the invention.

Now therefore I claim:
1. A process for making a bread product from a developed bread dough, said process comprising:
   (a) reducing the ambient pressure of said dough to a predetermined level below atmospheric level to expand said dough to a predetermined extent;
   (b) applying heat to said dough so as to bake the dough, and (c) while so applying heat to said dough, raising the ambient pressure of said dough to atmospheric.

2. The process as recited in claim 1, wherein in the first step of said process said pressure is reduced from atmospheric to between about 10 to 3 pounds per square inch absolute.

3. The process as recited in claim 1, wherein in the first step of said process said pressure is reduced from atmospheric to between about 7 to 4 pounds per square inch absolute.

4. The process as recited in claim 1, wherein the ambient pressure is raised to atmospheric by confining said bread at said predetermined ambient pressure in an airtight chamber having a predetermined volume in relation to the quantity of dough being baked, the volume of said chamber being such in relation to the quantity of bread being baked that gases emitted from said dough during the baking thereof raise the pressure in said chamber to about atmospheric level.

5. The process as recited in claim 4, wherein during the baking, when the pressure in said chamber reaches a level about equal to atmospheric pressure, the pressure in said chamber is maintained at about atmospheric level.

6. A process for making a bread product from a developed bread dough, said process comprising:
 (a) reducing the ambient pressure of a predetermined quantity of said dough to a predetermined level below atmospheric level to expand said dough to a predetermined extent;
 (b) confining said dough at said pressure level in a chamber of a predetermined volume,
 (c) while so confining said dough applying heat to said dough so as to bake the dough,
 (d) the quantity of dough being such in relation to the volume of said chamber that gases emitted from said dough during the baking raise the pressure within the chamber to about atmospheric level.

7. The process as recited in claim 6, wherein the baking of the dough is accomplished by means of microwaves.

8. The process as recited in claim 6, wherein the upper limit of the ratio of the volume of the chamber to the quantity of dough being baked is about 50 cubic centimeters to 1 gram of dough.

9. The process as recited in claim 8, wherein in the first step of said process said pressure is reduced to a level between about 10 to 3 pounds per square inch.

10. The process as recited in claim 6 wherein the upper limit of the ratio of the volume of the chamber to the quantity of dough being baked is about 30 cubic centimeters to 1 gram of dough.

11. The process as recited in claim 6, wherein when the pressure in said chamber goes above a level about equal to atmospheric, the pressure in said chamber is maintained at a level about equal to atmospheric.

12. The process as recited in claim 11, wherein the ratio of the volume of the chamber to the quantity of dough being baked is between about 50 cubic centimeters to 1 gram of dough and about 5 cubic centimeters to 1 gram of dough.

13. The process as recited in claim 12, wherein said pressure is initially reduced from atmospheric to between about 10 to 3 pounds per square inch.

14. A process for making a bread product from a developed bread dough, said process comprising:
 (a) placing a predetermined quantity of said dough in a chamber of a predetermined volume,
 (b) reducing the pressure in said chamber to between about 10 to 3 pounds per square inch,
 (c) sealing said chamber,
 (d) applying heat to said dough so as to bake said dough,
 (e) the quantity of dough being such in relation to the volume of said chamber that gases emitted from said dough during the baking raise the pressure within the chamber to about atmospheric level.

References Cited

UNITED STATES PATENTS

| | | | |
|---|---|---|---|
| 1,076,464 | 10/1913 | Stiriz | 107—54 X |
| 2,621,616 | 12/1952 | Ames | 107—54 |
| 2,888,542 | 5/1959 | Mork | 219—10.55 |

WILLIAM I. PRICE, *Primary Examiner.*

J. SHEA, *Assistant Examiner.*